Jan. 18, 1949.  J. M. GORDON  2,459,693
LAMINATED PHOSPHORESCENT FLUORESCENT ARTICLE
Filed Aug. 14, 1944
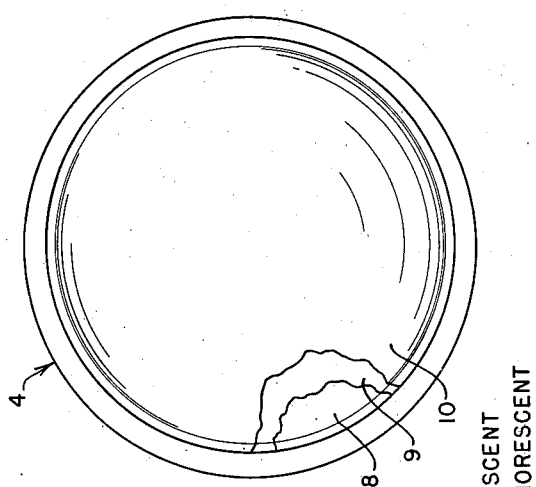
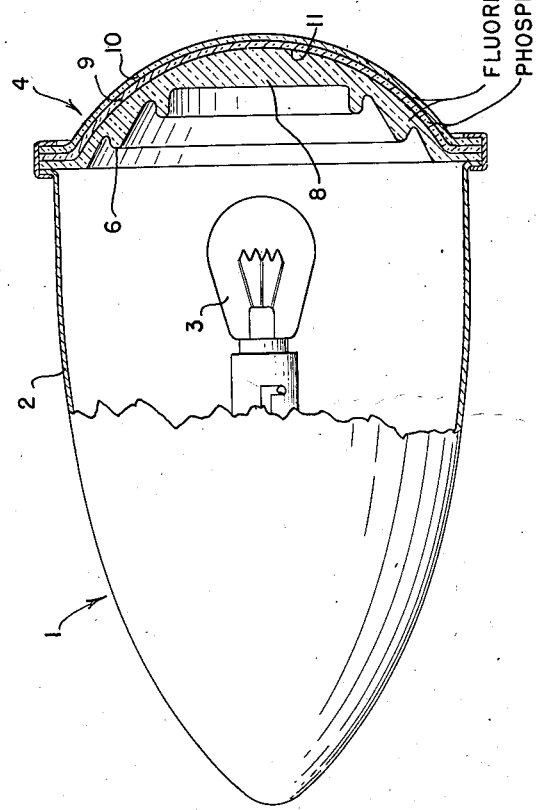
INVENTOR.
JOSEPH M. GORDON
BY
ATTORNEY Patented Jan. 18, 1949

2,459,693

UNITED STATES PATENT OFFICE 2,459,693

LAMINATED PHOSPHORESCENT FLUORESCENT ARTICLE

Joseph M. Gordon, Chicago, Ill.

Application August 14, 1944, Serial No. 549,366

6 Claims. (Cl. 250—71)

This invention relates to signaling means, particularly as applied to vehicles such as, for instance, automobiles, and more particularly to signaling means which is effective at night to indicate by its presence the location of an automobile or the like to which it is attached, even though the lighting system of the automobile is not operating.

It is one of the objects of the present invention to provide a phosphorescent signal which is activated either by daylight or by the light of an electric bulb on the automobile, and which will continue to emit light after extinguishment of the light of the bulb and thus afford a signal of the presence of the automobile even if the automobile lighting system should fail. This is particularly important during the first ten or fifteen minutes after failure of the automobile lighting system as it affords protection until the motorist can correct the trouble or move out of a position which is rendered dangerous by the failure of the lighting system.

It is a further object of the invention to incorporate the above mentioned signal means in a usually provided signal lamp of an automobile, such as the tail lamp of the automobile, or the stop lamp, or the stop and tail lamp. Such lamps generally have a rearwardly facing red window through which the light from the electric light bulb is emitted, red being the generally accepted danger indicating color. It is one of the objects of the present invention to provide a lamp of the above mentioned character which will transmit light therethrough from the electric light bulb within the lamp and which will reflect incident light from the head lights of an approaching automobile in the same manner as is usual in the art. In addition, the lamp constructed in accordance with the present invention is so arranged as to be activated by light from within the lamp or by incident light from without, so that upon removal or failure of the activating source the lamp or a part thereof will glow and thus constitute a light source. In accordance with the present invention the light transmitting body of the lamp, or the lamp lens is made of molded or pressed plastic which consists of a layer of phosphorescent plastic sandwiched between two layers of fluorescent plastic. The inner and outer fluorescent layers may consist of plastic having the well known fluorescent materials incorporated therein so that they will fluoresce under the action of ultra violet or visible light. These inner and outer layers are of transparent or translucent material to transmit light from the light source within the lamp body as well as to transmit reflected light, and they are red in order to impart the red color to the light emitted or transmitted.

It is known that ordinary phosphorescent materials are quenched by red glass or the usual red pigments that are used. However, red fluorescent material does not quench the effect of subjacent phosphorescent material. Since the phosphorescent material must be overlaid by a material that emits red light, I use the fluorescent overlaying layer which, therefore, does not absorb or quench the rays emitted by the phosphorescent layer.

In accordance with the principles of the present invention the lens of an automobile tail lamp is made of a laminated construction comprising a central phosphorescent sheet sandwiched between two red fluorescent sheets, the entire lens being molded or pressed into one integral structure of the required shape. The shape may be that of any known lens construction including irregular fresnal rings formed on the inner surface of the lens and/or including one or more light reflecting projections of the type which will reflect incident light in the form of a beam substantially but not quite parallel to the incident light beam, all as known in the usual lens art.

It is known that some phosphorescent materials are unstable when exposed to the atmosphere. Except for their instability many such materials are preferable to other phosphorescent materials, the preference being sometimes one of cost and other times one of quantity or duration of phosphorescence. In the device of the present invention the phosphorescent material is embedded in and completely covered by the overlaying and underlaying layers of fluorescent plastic material. It is therefore possible to use those superior phosphorescent materials which are unstable at atmospheric conditions, because in the device of the present invention the phosphorescent material is completely protected from the atmosphere.

The attainment of the above and further objects of the present invention will be apparent from the following specification taken in conjunction with the accompanying drawing forming a part thereof.

In the drawing:

Figure 1 is a longitudinal sectional view through an automobile stop and tail lamp embodying the present invention; and Figure 2 is a front view of the lens of the lamp of Figure 1.

Referring now more particularly to the drawing, there is shown at 1 an automobile stop and tail lamp to which the present invention has been applied. The lamp 1 includes a casing 2 in which is mounted a two filament electric light bulb 3 of standard construction, which at one brightness functions as a tail light and at a higher brightness functions as a stop light. A lens 4, of the desired shape, is secured to the casing 2 in any desired manner, as by a conventional split ring. For illustrative purposes the lens 4 has been shown as provided with a series of annular prisms 6 which bend the light from the bulb 3 into a beam which does not have too great a spread, as described, for instance, in the United States patent to Taylor, No. 2,064,501. It is, however, to be understood that the lens may be of any other particular shape desired. One typical shape is that shown in the United States patent to Davidson, No. 2,012,933, issued August 27, 1935, wherein the inner surface of the lens has a series of right angle tetrahedrons formed thereon to reflect incident light from the headlights of an approaching automobile back towards the approaching automobile in the form of a light beam almost parallel to the incident beam and with a very slight spread.

The lens 4 is a unitary laminated structure. It includes an inner lamination 8, an intermediate lamination 9, and an outer lamination 10, each of which is of plastic material pervious to light, that is, transparent or translucent. The inner and outer layers 8 and 10 are of red plastic to impart to light transmitted through the lens, red being the conventionally accepted color for indicating danger. The center layer 9 has incorporated therein phosphorescent material. By phosphorescent material I mean material which is excited by visible or near ultra-violet light to emit visible light not only during the time that it is being excited but also for a period of time after its excitation has ceased.

The pigments generally used to impart a red color to glass or to plastics usually quench the after-glow effects of phosphorescent materials. This may be due to absorption by the pigment of those wave lengths of light which activate the phosphorescent material, or due to the absorption of the light emitted by the phosphorescent material or due to a combination of both of those and parhaps other causes. However, if the pigment used to impart the red color to the laminations 8 and 10 is fluorescent pigment material then no such quenching effect is produced. The laminations 8 and 10 are therefore made of thermo-plastic material which would otherwise be clear and colorless but which is rendered red by having incorporated therein fluorescent pigments of the proper color which impart the red color to white light transmitted therethrough.

The three laminations 8, 9 and 10 may be individually molded or otherwise formed to exactly or approximately the required shapes and then united into one unitary integral structure by the application of a coating of plastic cement or, when made of thermo-plastic material they may be united by the application of heat and pressure through appropriately shaped dies. This is facilitated by the fact that the outer surface 11 of the layer 8 is smooth. The inner surface of the layer 9 may therefore quite easily be made a counterpart of the outer surface 11 of the layer 8. The same is true of the outer surface of the layer 9 and the inner surface of the layer 10.

Where the lens is of a shape such that its thickness does not vary greatly in different places the entire lens may be formed of three superimposed flat thermo-plastic sheets of which the center sheet has phosphorescent material incorporated therein and the upper and lower sheets have fluorescent material therein, the sheets being pressed to the desired shape by a pair of male and female dies and simultaneously integrally united by heat.

It is within the purview of the present invention to incorporate a laminated phosphorescent-fluorescent structure in a device which does not contain its own activating light source. For instance, a laminated structure consisting of a phosphorescent smooth or irregularly surfaced plastic sheet overlaid by a fluorescent plastic sheet, as hereinabove described, may be used as a road marker, activated by daylight or by a road light or by the headlights of approaching automobiles, or used as is any other marker, such as an exit marker, activated by a visible or invisible light source.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A signal lamp light transmitting cover comprising a transparent body at least a part of which comprises a transparent layer containing phosphorescent material overlaid on opposite sides by light-pervious fluorescent materials.

2. A signal apparatus comprising a light-pervious body at least a part of which comprises a layer of light-pervious phosphorescent material overlaid by a layer of light-pervious fluorescent material which imparts a characteristic color to light passing through the apparatus, and which is pervious to light of the wave lengths emitted by the phosphorescent material.

3. A lamp comprising an electric light bulb and a light transmitting cover comprising a laminated structure including at least two layers, one of said layers including phosphorescent material activated by light from the bulb and emitting light after excitation by the electric light bulb, the other layer being of a light-pervious material having a red fluorescent substance incorporated therein.

4. A light emitting structure to be used as a marker, and comprising a layer of phosphorescent material overlaid by a layer of light-pervious material having red fluorescent pigment incorporated therein.

5. As an article of manufacture, an integral laminated structure comprising a central body of plastic material sandwiched between two outer plastic bodies and in surface to surface contact with the two outer bodies along substantially their entire areas that face one another, the central body having phosphorescent material incorporated therein and the outer plastic bodies having red fluorescent material incorporated therein, all of said bodies being pervious to light.

6. An article of manufacture comprising three superposed sheets of plastic material that is pervious to light, said sheets being in surface to surface contact along substantially their entire areas that face one another and said sheets being laminated together to form one integral structure, the central sheet having phosphorescent material incorporated therein and the other sheets having red color producing material incorporated therein, the red color producing material in at least one of the two outer sheets being fluorescent material.

JOSEPH M. GORDON.

REFERENCES CITED

The following references are of record in the file of this patent:

UNITED STATES PATENTS

| Number | Name | Date |
|---|---|---|
| 1,275,890 | Flannery et al. | Aug. 13, 1918 |
| 1,312,312 | Dodds | Aug. 5, 1919 |
| 1,847,134 | Nikonow | Mar. 1, 1932 |
| 1,925,546 | Sheppard | Sept. 5, 1933 |
| 2,000,985 | Quinlan et al. | May 14, 1935 |
| 2,064,501 | Taylor | Dec. 15, 1936 |
| 2,144,040 | Wurstlin | Jan. 17, 1939 |
| 2,177,691 | Dawihl et al. | Oct. 31, 1939 |
| 2,243,828 | Leverenz | May 27, 1941 |
| 2,272,375 | Kallmann et al. | Feb. 10, 1942 |

FOREIGN PATENTS

| Number | Country | Date |
|---|---|---|
| 286,283 | Great Britain | Oct. 11, 1937 |